United States Patent
Schneider et al.

(10) Patent No.: US 9,810,337 B2
(45) Date of Patent: Nov. 7, 2017

(54) CONTROL DEVICE FOR SELECTIVELY FLUIDICALLY CONNECTING AND DISCONNECTING FLUID CONNECTION POINTS

(71) Applicant: HYDAC FLUIDTECHNIK GMBH, Sulzbach/Saar (DE)

(72) Inventors: Gerd Schneider, Dillingen (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/913,400

(22) PCT Filed: Aug. 12, 2014

(86) PCT No.: PCT/EP2014/002211
§ 371 (c)(1),
(2) Date: Feb. 22, 2016

(87) PCT Pub. No.: WO2015/036076
PCT Pub. Date: Mar. 19, 2015

(65) Prior Publication Data
US 2016/0178079 A1  Jun. 23, 2016

(30) Foreign Application Priority Data
Sep. 16, 2013 (DE) .................. 10 2013 015 481

(51) Int. Cl.
F16K 11/07 (2006.01)
F16K 27/02 (2006.01)
F16K 31/06 (2006.01)

(52) U.S. Cl.
CPC ........ *F16K 27/029* (2013.01); *F16K 31/0613* (2013.01); *Y10T 137/8671* (2015.04)

(58) Field of Classification Search
CPC ....... Y10T 137/8671; Y10T 137/86702; Y10T 137/86694; F16K 31/063; F16K 27/029
(Continued)

(56) References Cited

U.S. PATENT DOCUMENTS 3,921,111 A    11/1975  Kowalski
3,972,505 A *  8/1976  Padula ................ F16K 31/0627
                                              137/625.65
(Continued)

FOREIGN PATENT DOCUMENTS

DE        33 16 736      7/1992
DE    20 2004 010 888    11/2004
(Continued)

OTHER PUBLICATIONS

International Search Report (ISR) dated Nov. 21, 2014 in International (PCT) Application No. PCT/EP2014/002211.

*Primary Examiner* — Craig J Price
(74) *Attorney, Agent, or Firm* — Wenderoth, Lind & Ponack, L.L.P.

(57) ABSTRACT

A control device selectively fluidically connects and disconnects fluid connection points (A, P, T) by a valve (5), which controls fluid-conducting connection channels (55, 57, 59) extending between the connection points (A, P, T). The connection channels are arranged in a control block (3), into which the valve (5) is at least partially inserted. Proceeding from the respective fluid connection points (A, P, T), the connection channels (55, 59, 57) connected to the fluid connection points extend in parallel to each other until the connection channels lead into a respective control chamber (49; 53, 51). The valve (5) is retained in a receptacle (39) separating two adjacently arranged control chambers (49, 51) from each other.

21 Claims, 2 Drawing Sheets

(58) Field of Classification Search
USPC .................................. 137/625.67–625.69
See application file for complete search history.

(56) References Cited

U.S. PATENT DOCUMENTS

| | | | |
|---|---|---|---|
| 5,374,029 A | 12/1994 | Bailey | |
| 5,445,188 A * | 8/1995 | Bourkel | F15B 13/0402 137/625.63 |
| 6,698,713 B2 * | 3/2004 | Sato | F16K 31/0634 251/129.15 |
| 7,159,615 B2 * | 1/2007 | Yamamoto | F16K 31/0624 137/596.17 |
| 8,678,340 B2 * | 3/2014 | Ishii | F16H 61/0206 137/625.65 |
| 9,303,535 B2 * | 4/2016 | Kira | F01L 1/344 |
| 2006/0065315 A1 | 3/2006 | Neff et al. | |
| 2007/0295417 A1 | 12/2007 | Wang | |
| 2009/0256094 A1 * | 10/2009 | Sasago | F15B 13/0405 251/129.15 |

FOREIGN PATENT DOCUMENTS

| | | |
|---|---|---|
| DE | 601 29 285 | 3/2008 |
| DE | 10 2007 042 046 | 3/2009 |
| EP | 0 947 754 | 10/1999 |
| EP | 1 643 174 | 4/2006 |

* cited by examiner

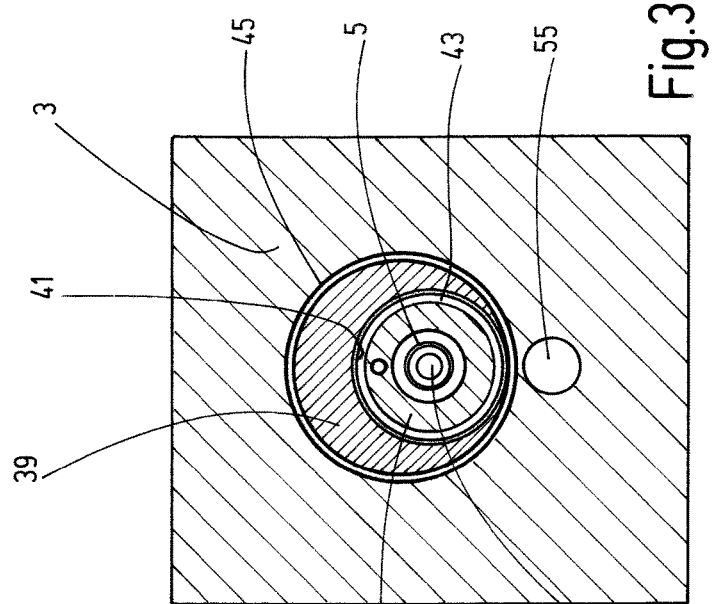
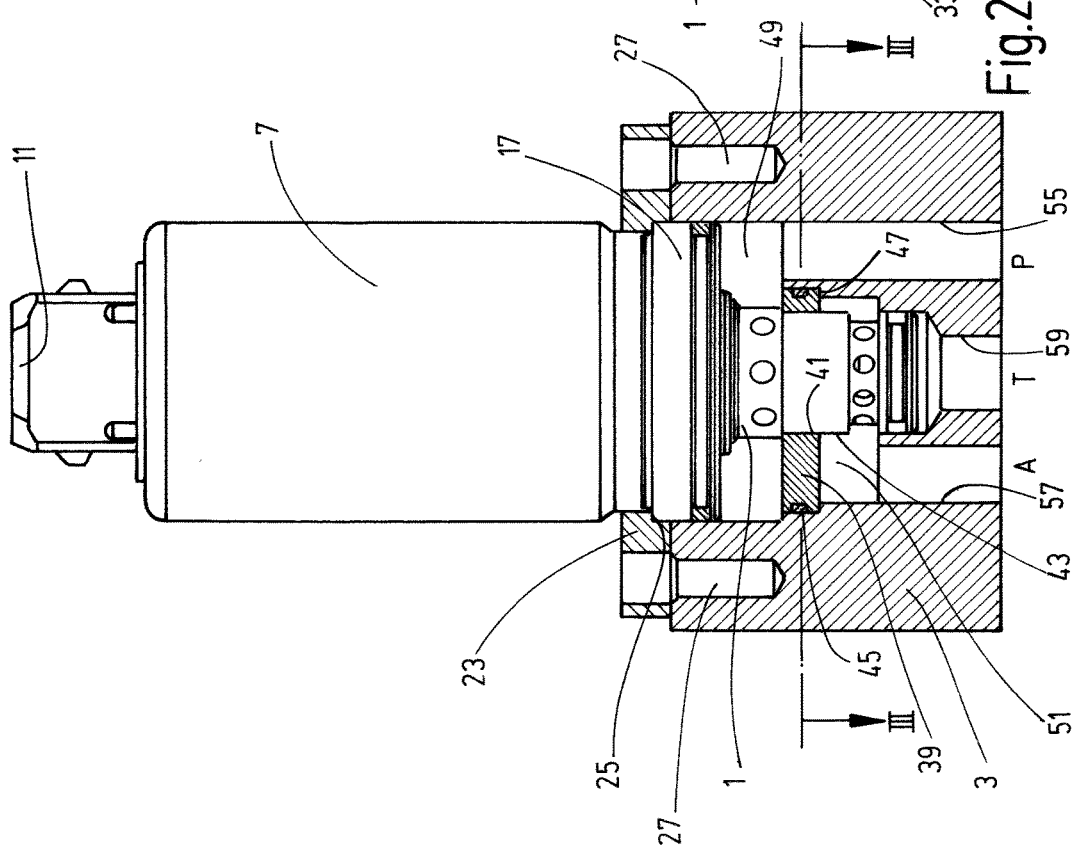

CONTROL DEVICE FOR SELECTIVELY FLUIDICALLY CONNECTING AND DISCONNECTING FLUID CONNECTION POINTS

FIELD OF THE INVENTION

The invention relates to a control device for selectively fluidically connecting and disconnecting fluid connection points by a valve apparatus. The valve apparatus controls fluid-conducting connection channels extending between the connection points. The connection channels are arranged in a control block, into which the valve apparatus is at least partially inserted.

BACKGROUND OF THE INVENTION

Control devices of this type are very frequently used for mobile work machines for the electro-hydraulic control of couplings and hydraulic actuating elements. Valve apparatuses in the form of proportional pressure control valves, such as 3/2-way gate valves, are usually used in this context. The couplings and hydraulic actuating elements to be controlled are built into transmission casings in these applications. The valve apparatuses are usually formed by cartridge valves inserted into a corresponding control block, with the control blocks being flange-mounted at the sides on the respective transmission. In light of the fact that, in the case of tractor transmissions, for example, more than ten valves may be required to control couplings and actuators, and that each of the valves is to be connected to a pump connection and a tank connection, and the working connection of each valve is to be connected to the respective coupling or actuating element to be controlled, considerable construction expenditures and cost expenditures are involved in the formation of the required fluid connection paths together with the associated pipework.

SUMMARY OF THE INVENTION

In light of this problem, an objective of the invention is to provide an improved control device of the aforementioned type, which is distinguished by a design that can be economically produced and by an advantageous operating behavior.

This objective is basically achieved according to the invention by a control device having, as a significant distinctive feature of the invention, proceeding from respective fluid connection points, connection channels respectively being connected to the fluid connection points and extending parallel to each other until the connection channels open into a respectively assigned control chamber of the valve apparatus. The valve apparatus is held in a receptacle, which separates at least two adjacently arranged control chambers from each other. Because the receptacle, which forms a seat for the valve apparatus in the installation space, forms a sealing point between control chambers, which are axially offset relative to each other in the case of the gate valves in question, terrace steps which are axially offset relative to each other are formed in the installation space. Terminal connection channels can then be formed in a simple and economical manner by bores extending in parallel. The bores can extend in any direction relative to the valve axis, i.e. also vertically or slightly inclined. Since the connection channels to the respective steps of the valve, which steps are offset relative to each other in axial directions in the case of the valves in question, such as cartridge valves, no longer have to extend vertically relative to the valve axis.

A particularly advantageous option is forming connection channels extending parallel in any direction relative to the valve axis, for example parallel to the valve axis or slightly inclined relative to the valve axis. The ability to freely configure permits an economical production and a design with very short fluid connection paths, which short fluid connection paths improve the dynamics of the operating behavior.

Advantageously, the valve apparatus can be provided with a casing, which itself at least partially forms a control chamber and/or which has at least one bore that opens into a control chamber. This arrangement results in particularly short fluid connection paths.

In particularly advantageous exemplary embodiments, in view of the parallel arrangement of the connection channels, the receptacle for the valve apparatus can be accommodated eccentrically relative to the displacement axis of the valve gate, which is longitudinally-displaceably guided inside the valve casing, in the control block.

Particularly advantageously, the receptacle can be formed from a circular cylindrical receiving plate, which has a preferably circular cylindrical recess for receiving the valve casing. The center axis of the recess extending parallel to the center axis of the receiving plate is arranged offset relative to same. This offset allows the connection channel bypassing the receiving plate to bring the recess closer to the valve axis according to the eccentricity, resulting in a saving of installation space required for the control block.

As a result, in a particular advantageous manner, the connection channel for the pressure supply connection and the connection channel for the service connection can take up, with their respective longitudinal axis, approximately the same distance to the displacement axis of the valve gate. The longitudinal axis of the connection channel for the tank connection or return connection is then able to be coextensive with the displacement axis of the valve gate.

The pressure supply connection channel extending in the control block can be formed such that it is longer than the service connection connecting channel in the axial direction. This service connection channel, in turn, can be formed such that it is longer than the tank connection channel.

In addition, in advantageous exemplary embodiments the control chamber into which the pressure supply connection channel opens can lie above the control chamber into which the service connection connecting channel opens, viewed in the actuation direction of the valve gate. These two control chambers can then be separated from each other in a fluid-tight manner by the receptacle.

With this arrangement of the receptacle, the control chamber into which the service connection connecting channel opens can lie above the control chamber into which the tank connection channel opens, viewed in the actuation direction of the valve gate. These two adjacent control chambers can be separated from each other in a fluid-tight manner by valve casing parts, which are encompassed by parts of the control block.

In particularly advantageous exemplary embodiments, the plate forming the receptacle can be encompassed on the outer peripheral side by a sealing device, which produces the seal between the receptacle and the control block.

A particular advantage of the invention is that the control block can be a component of a transmission casing, in particular a mobile work machine, or can be attached to the transmission casing. This arrangement permits, in particular in the case of complete elimination of the control block, a significant cost saving, associated with a corresponding reduction of the required installation space, simplification through less effort invested in pipework and improvement of the operating behavior through better dynamics as a result of shorter connection paths.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is a side view of the control device of FIG. 1, wherein the installation space area of an assigned control block is depicted in a longitudinal section; and FIG. 3 is a plan view in section take along the line III-III of FIG. 2.

DETAILED DESCRIPTION OF THE INVENTION

Figure 1:
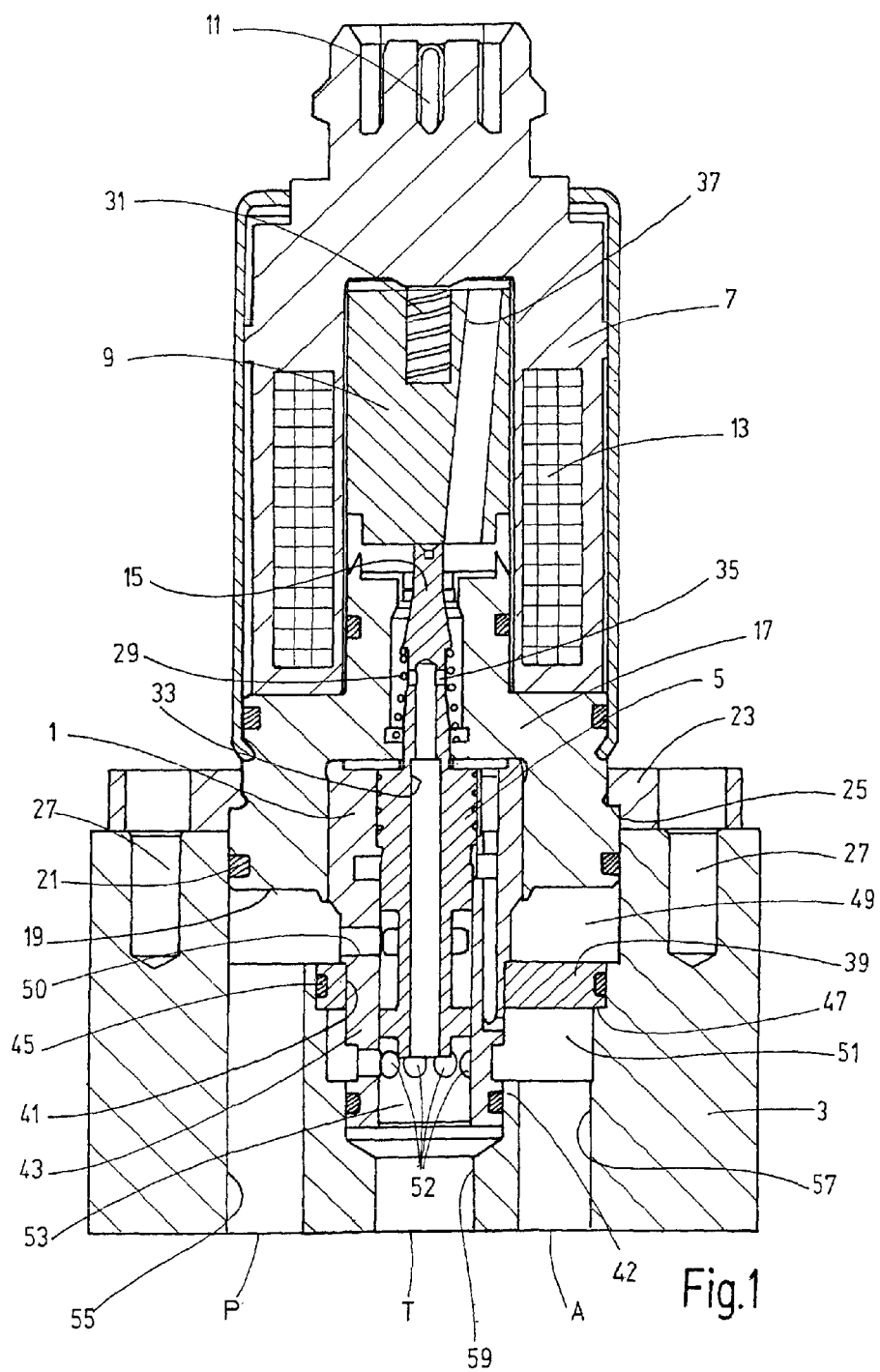
FIG. 1 is a side view in section of a control device according to an exemplary embodiment of the invention.

In the control device depicted in the figures, the valve apparatus has a proportional pressure control valve in the form of a cartridge valve that can be actuated electromagnetically and that is installed with its valve casing 1 in a control block 3. The control block 3 forms, in a conventional manner, fluid connection points comprising a pressure supply connection P, a service connection with A and a return connection or tank connection with T. A valve piston 5 longitudinally-displaceably guided in the valve casing 1 can be controlled by an actuating device 7 in the form of an actuating magnet so as to assume its individual displacement positions. The actuating device 7 is designed in accordance with the prior art and has, for the purpose of displacement of a magnet armature 9, a coil winding 13 that can be powered by a plug 11. The actuating device 7 is designed as a repelling magnet, i.e. when the coil winding 13 is powered, the magnet armature 9 moves downwards as viewed in the direction of FIG. 1 and exerts, by an actuating plunger 15 formed by an extension of the valve piston 5, a force on this valve piston, which force triggers a displacement movement of the valve piston 5.

The actuating device 7 has a pole core 17 which, in the installed state, extends with its end 19 into the installation space of the control block 3. A sealing element 21 forms the seal of the installation space. In the installed state, a flange ring 23 abuts a step 25 of the pole core 17 and forms a flange connection with the control block 3 by fastening screws 27. The above-described design of the valve apparatus, including a valve spring 29, which holds the valve piston 5 such that it bears on the magnet armature 9 in a non-positive manner, and a weak-effect counteracting spring 31 on the magnet piston 9, is known per se. In a likewise known manner, an axial bore 33 in the valve piston 5 forms, together with a transverse bore 35 and via an inclined bore 37 formed in the magnet piston 9, a channel for a pressure equalization in the case of displacement movements of magnet armature 9 and valve piston 5, as is likewise known per se in the case of such valve apparatuses.

As the figures show, a receiving plate 39 is provided in the installation space in the control block 3 as a receptacle, which forms a seat for the valve casing 1. The receiving plate 39 has the shape of a circular cylindrical body and has a circular cylindrical recess 41 (FIG. 1), through which the valve casing 1 extends with its circular cylindrical end part 43. The outer periphery of the end part 43 abuts the recess 41 in a fluid-tight manner. On the outer periphery, the receiving plate 39 is sealed by a sealing element 45 on the control block 3, where the receiving plate 39 abuts a step 47 formed in the installation space. In this arrangement, the receiving plate 39 forms a fluid-tight partition between a control chamber 49 lying at the receiving plate top in FIGS. 1 and 2 and a lower control chamber 51 which, in the conventional manner for cartridge valves, are surrounded by fluid passages of the valve casing 1, which fluid passages are formed by bores 50 and 52. The valve casing 1 forms a third control chamber 53 with its open end on the end part 43.

Connection channels are formed in the control block 3 for the fluid connection between the connection points for the pressure connection P, the tank or return connection T and the service connection A and the assigned control chambers 49, 53 and 51 respectively. Each of these connection channels is formed by bores extending parallel to the displacement axis of the valve piston 5. A first bore 55 is located at a distance to the displacement axis and connects the pressure supply connection P to the associated control chamber 49. A second bore 57, likewise located at a distance to the displacement axis, connects the service connection point A to the control chamber 51. A third bore 59 is coaxial to the displacement axis and connects the tank connection point T via the open end of the valve casing 1 to the control chamber 53. The control chamber 53 is sealed relative to the control chamber 51 of the service connection A by a casing part 42 of the control block 3, which casing part encompasses the end part 43 of the valve casing 1. As can be seen from the figures, the bore 55 leading to the top control chamber 49 bypasses the receiving plate 39. The bore 57, which leads to the control chamber 51 lying on a lower step, is delimited in the upwards direction by the receiving plate 39. For this purpose, the round body forming the receiving plate 39 has a diameter of such dimensions that it overlaps the bore 57 and, at its circumferential edge, abuts the step 47 of the control block 3. In order to avoid having to place the opposite bore 55, which is assigned to the pressure supply connection point P and which the receiving plate 39 must bypass, at too great a distance to the displacement axis, the recess 41 for the passage of the valve casing 1 in the receiving plate 39 is not arranged centrally, but rather eccentrically. Due to this eccentric arrangement, the step 47 on the side of the bore 55 is located at a lesser distance to the displacement axis than the step 47 in the region of the opposite bore 57. Accordingly, the bore 55 can, although it must bypass the receiving plate 39, be arranged at approximately the same distance from the displacement axis of the valve piston 5, as in the case of the bore 57 that helps to achieve a compact design.

Because the control chamber 49 adjoining the top side of the receiving plate 39 conducts the pressure of the supply connection point P, while the control chamber 51 adjoining the bottom side conducts the pressure of the service connection point A, the connection plate 39 applies a load to the step 47 in the installation space due to the fact that, during operation, the pressure in the top control chamber 49 is greater/equal to the pressure in the lower control chamber 51. Thus, in spite of the eccentricity, there is no bending moment acting on the valve body 1, which could lead to jamming of the valve piston 5.

The ability to form the bores 55, 57, 59 forming the connection channels axially parallel to the displacement axis of the valve eliminates the need to form transverse bores in a respective casing forming the installation space for the respective cartridge valve. The valves can then be flanged directly on a transmission casing, or the transmission casing itself can form, by parts, installation spaces, which perform the function of respective control blocks. In other words, the invention also permits a direct installation of the control device in transmission casings, because no transverse casing bores are required.

While one embodiment has been chosen to illustrate the invention, it will be understood by those skilled in the art that various changes and modifications can be made therein without departing from the scope of the invention as defined in the claims.

The invention claimed is:

1. A control device, comprising:
a valve having a valve gate;
a control block receiving said valve at least partially in said control block, said valve gate being longitudinally-displaceably guided for movement in said control block along a displacement axis;
first, second and third connection points on said control block;
first, second and third fluid-conducting connection channels extending in said control block and being connected to said first, second and third connection points, respectively, said valve controlling connection and disconnection of respective ones of said connection channels to control connection and disconnection of respective ones of said connection points, said connection channels extending parallel to each other from the respective connection points to openings of said connection channels into first, second and third control chambers, respectively, in said control block and connected to said valve; and
a receptacle in said control block, said receptacle holding said valve in said receptacle and fluidly separating said first and second control chambers arranged adjacent to one another, said receptacle is eccentrically arranged in said control block relative to said displacement axis of said valve.

2. A control device according to claim 1 wherein said valve comprises a casing partially forming said third control chamber.

3. A control device according to claim 2 wherein said valve comprises the casing having first and second bores opening into said first and second control chambers, respectively.

4. A control device according to claim 1 wherein said receptacle comprises a circular cylindrical receiving plate having a recess in said receiving plate receiving a valve casing of said valve, said recess having a center axis extending parallel to and offset from a center axis of said receiving plate.

5. A control device according to claim 4 wherein said recess is a circular cylindrical recess.

6. A control device according to claim 4 wherein said receiving plate is encompassed on an outer peripheral of said receiving plate by a seal forming a sealed connection between said receiving plate and said control block.

7. A control device according to claim 1 wherein said first connection channel is a pressure supply connection and has a first longitudinal axis;
said second connection channel is a service connection and has a second longitudinal axis, said first and second longitudinal axes being spaced approximately equal distances from said displacement axis; and
said third connection channel is a tank or return connection and has a longitudinal axis coaxial to said displacement axis.

8. A control device according to claim 1 wherein said first connection channel is a pressure supply connection;
said second connection channel is a service connection, said first connection channel being longer than said second connection channel in longitudinal axial directions of said first and second connection channels; and
said third connection channel is a tank or return connection, said second connection channel being longer than said third connection channel in longitudinal axial directions of said second and third connection channels.

9. A control device according to claim 1 wherein said first connection channel is a pressure supply connection;
said second connection channel is a service connection;
said first control chamber lies above said second control chamber in a direction of actuation of said valve gate, said first and second control chambers being separated fluid tight by said receptacle.

10. A control device according to claim 1 wherein said second connection channel is a service connection;
said third connection channel is a tank or return connection;
said second control chamber lies above said third control chamber in a direction of actuation of said valve gate; and
said second and third control chambers are separated from each other in a fluid-tight manner by parts of a valve casing of said valve, said parts of said valve casing being encompassed by parts of said control block.

11. A control device according to claim 1 wherein said control block is at least one of a component of a mobile work machine transmission casing or attached to a mobile work machine transmission casing.

12. A control device, comprising:
a valve;
a control block receiving said valve at least partially in said control block;
first, second and third connection points on said control block;
first, second and third fluid-conducting connection channels extending in said control block and being connected to said first, second and third connection points, respectively, said valve controlling connection and disconnection of respective ones of said connection channels to control connection and disconnection of respective ones of said connection points, said connection channels extending parallel to each other from the respective connection points to openings of said connection channels into first, second and third control chambers, respectively, in said control block and connected to said valve; and
a receptacle in said control block, said receptacle holding said valve in said receptacle and fluidly separating said first and second control chambers arranged adjacent to one another, said receptacle being a circular cylindrical receiving plate having a recess in said receiving plate receiving a valve casing of said valve, said recess having a center axis extending parallel to and offset from a center axis of said receiving plate.

13. A control device according to claim 12 wherein said recess is a circular cylindrical recess.

14. A control device according to claim 12 wherein
said valve comprises a valve gate longitudinally displaceably guided for movement in said control block along a displacement axis;
said first connection channel is a pressure supply connection and has a first longitudinal axis;
said second connection channel is a service connection and has a second longitudinal axis, said first and second longitudinal axes being spaced approximately equal distances from said displacement axis; and
said third connection channel is a tank or return connection and has a longitudinal axis coaxial to said displacement axis.

15. A control device according to claim 12 wherein
said valve comprises a valve gate longitudinally displaceably guided for movement in said control block along a displacement axis;
said first connection channel is a pressure supply connection;
said second connection channel is a service connection, said first connection channel being longer than said second connection channel in longitudinal axial directions of said first and second connection channels; and
said third connection channel is a tank or return connection, said second connection channel being longer than said third connection channel in longitudinal axial directions of said second and third connection channels.

16. A control device according to claim 12 wherein
said valve comprises a valve gate longitudinally displaceably guided for movement in said control block along a displacement axis;
said first connection channel is a pressure supply connection;
said second connection channel is a service connection;
said first control chamber lies above said second control chamber in a direction of actuation of said valve gate, said first and second control chambers being separated fluid tight by said receptacle.

17. A control device according to claim 12 wherein
said valve comprises a valve gate longitudinally displaceably guided for movement in said control block along a displacement axis;
said second connection channel is a service connection;
said third connection channel is a tank or return connection;
said second control chamber lies above said third control chamber in a direction of actuation of said valve gate; and
said second and third control chambers are separated from each other in a fluid-tight manner by parts of a valve casing of said valve, said parts of said valve casing being encompassed by parts of said control block.

18. A control device, comprising:
a valve having a valve gate longitudinally displaceable along a displacement axis;
a control block receiving said valve at least partially in said control block;
pressure supply, service and tank or return connection points on said control block;
pressure supply, service and tank or return fluid-conducting connection channels extending in said control block and being connected to pressure supply, service and tank or return connection points, respectively, said valve controlling connection and disconnection of respective ones of said connection channels to control connection and disconnection of respective ones of said connection points, said connection channels extending parallel to each other from the respective connection points to openings of said connection channels into pressure supply, service and tank or return control chambers, respectively, in said control block and connected to said valve; and
a receptacle in said control block, said receptacle holding said valve in said receptacle and fluidly separating said pressure supply and service control chambers arranged adjacent to one another;
longitudinal axes of said pressure supply connection channel and said service connection channel being spaced approximately equal distances from said displacement axis; and
a longitudinal axis of said tank or return connection channel being coaxial to said displacement axis.

19. A central device according to claim 18 wherein
said pressure supply connection channel is longer than said service connection channel in longitudinal axial directions of said pressure supply connection channel and said service connection channel; and
said service connection channel is longer than said tank or return connection channel in longitudinal axial directions thereof.

20. A control device according to claim 18 wherein
said pressure supply control chamber lies above said service control chamber in an actuation direction of said valve gate, said pressure supply control chamber and said service control chamber being separated fluid-tight by said receptacle.

21. A control device according to claim 18 wherein
said service control chamber lies above said tank or return control chamber in an actuation direction of said valve gate; and
said service control chamber and said tank or return control chamber are separated from each after in a fluid-tight manner by parts of a valve casing of said valve, said parts of said valve casing being encompassed by parts of said control block.

\* \* \* \* \*